(12) United States Patent
Naritomi et al.

(10) Patent No.: US 8,367,210 B2
(45) Date of Patent: Feb. 5, 2013

(54) COMPOSITE ARTICLE OF ALUMINUM ALLOY WITH RESIN AND METHOD FOR PRODUCTION THEREOF

(75) Inventors: Masanori Naritomi, Tokyo (JP); Naoki Ando, Tokyo (JP); Masao Takahashi, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 866 days.

(21) Appl. No.: 10/533,655

(22) PCT Filed: Nov. 7, 2003

(86) PCT No.: PCT/JP03/14213
§ 371 (c)(1),
(2), (4) Date: Nov. 16, 2005

(87) PCT Pub. No.: WO2004/041532
PCT Pub. Date: May 21, 2004

(65) Prior Publication Data
US 2006/0127684 A1      Jun. 15, 2006

(30) Foreign Application Priority Data

Nov. 8, 2002   (JP) ................. 2002-325244

(51) Int. Cl.
*B32B 7/04* (2006.01)
*B32B 15/04* (2006.01)
*C23C 22/56* (2006.01)
(52) U.S. Cl. ......... 428/420; 428/457; 428/458; 148/275
(58) Field of Classification Search .................. 428/458, 428/420, 457; 148/285, 275
See application file for complete search history.

(56) References Cited

U.S. PATENT DOCUMENTS
(Continued)

FOREIGN PATENT DOCUMENTS
JP      50-158539      12/1975
JP      53-11841       2/1978
(Continued)

OTHER PUBLICATIONS

Madden, H.H. and DW Goodman "An AES investigation of aluminum, Al oxide, and Al nitride thin films" Surface Science, vol. 150, Issue 1, Feb. 1985 (p. 39-46).*

(Continued)

*Primary Examiner* — Kevin R Kruer
(74) *Attorney, Agent, or Firm* — Westerman, Hattori, Daniels & Adrian, LLP

(57) ABSTRACT

The invention provides the advantages of a metallic housing and those of a synthetic resin structure for electronic devices, home electrical devices, etc., achieves high productivity and mass productivity, and enables a desired configuration and structure to be designed freely. As a pretreatment, a shaped aluminum alloy material is dipped in an aqueous solution of at least one selected from the group consisting of ammonia, hydrazine, and a water-soluble amine compound. A thermoplastic resin composition containing polyphenylene sulfide as a component is integrally bonded to the surface of the treated shaped aluminum alloy material by injection molding or other method. The molded article is a product made of the shaped aluminum alloy material and the thermoplastic resin composition containing PPS. Thus, the characteristic features of metal can be utilized in terms of mechanical strength and external appearance design. Moreover, a complicated configuration and structure can be formed inside the housing.

10 Claims, 1 Drawing Sheet

U.S. PATENT DOCUMENTS

| | | | | |
|---|---|---|---|---|
| 3,531,322 A * | 9/1970 | Kefalas et al. | ................. | 427/129 |
| 3,531,332 A * | 9/1970 | Anthony et al. | ............... | 148/274 |
| 3,856,560 A * | 12/1974 | Blackwell | ...................... | 428/461 |
| 4,171,563 A * | 10/1979 | Withoos | ........................... | 29/600 |
| 4,189,194 A | 2/1980 | Davies | | |
| 4,522,875 A | 6/1985 | Still, Jr. et al. | | |
| 4,547,274 A * | 10/1985 | Ohashi et al. | ............... | 430/278.1 |
| 4,642,161 A * | 2/1987 | Akahoshi et al. | ................ | 216/35 |
| 4,648,910 A | 3/1987 | Adams et al. | | |
| 4,870,377 A * | 9/1989 | Brown et al. | ................. | 333/238 |
| 5,212,214 A * | 5/1993 | Kallenbach | ................... | 523/218 |
| 6,238,783 B1 * | 5/2001 | Komai et al. | ............. | 428/312.8 |
| 6,329,042 B1 * | 12/2001 | Yamada et al. | ............. | 428/195.1 |
| 6,475,597 B2 * | 11/2002 | Komai et al. | ................. | 428/141 |
| 6,476,564 B1 * | 11/2002 | Tsuchida | ................... | 315/241 P |
| 6,706,207 B2 * | 3/2004 | Tucker et al. | ................ | 252/79.1 |
| 2001/0036559 A1 * | 11/2001 | Haack et al. | .................. | 428/577 |
| 2005/0215764 A1 * | 9/2005 | Tuszynski et al. | ............ | 530/358 |

FOREIGN PATENT DOCUMENTS

| | | |
|---|---|---|
| JP | 58-217679 | 12/1983 |
| JP | 05-070969 | 3/1993 |
| JP | 2001-225352 | 8/2001 |
| JP | 2003-200453 | 7/2003 |

OTHER PUBLICATIONS

Gajda, MA and H. Ahmed "Anisotropic etching of silicon in hydrazine" Sensors and Actuators A: Physical, vol. 40, Issue 3, Mar. 1994, pp. 227-236.*

Yamasaki, Hiroo Intelligent Sensors (1996) p50 http://books.google.com/books?id=kP2rS0AN7-4C&pg=PA49&dq=intelligent+sensors+hydrazine&hl=en&ei=c-53TcKONdORgQel4uy7BQ&sa=X&oi=book_result&ct=result&resnum=1&ved=0CDQQ6AEwAA#v=onepage&q=hydrazine&f=false.*

Supplementary European Search Report, Jun. 4, 2006, issued in corresponding Application No. 03810660.5-2124 PCT/JP0314213.

* cited by examiner

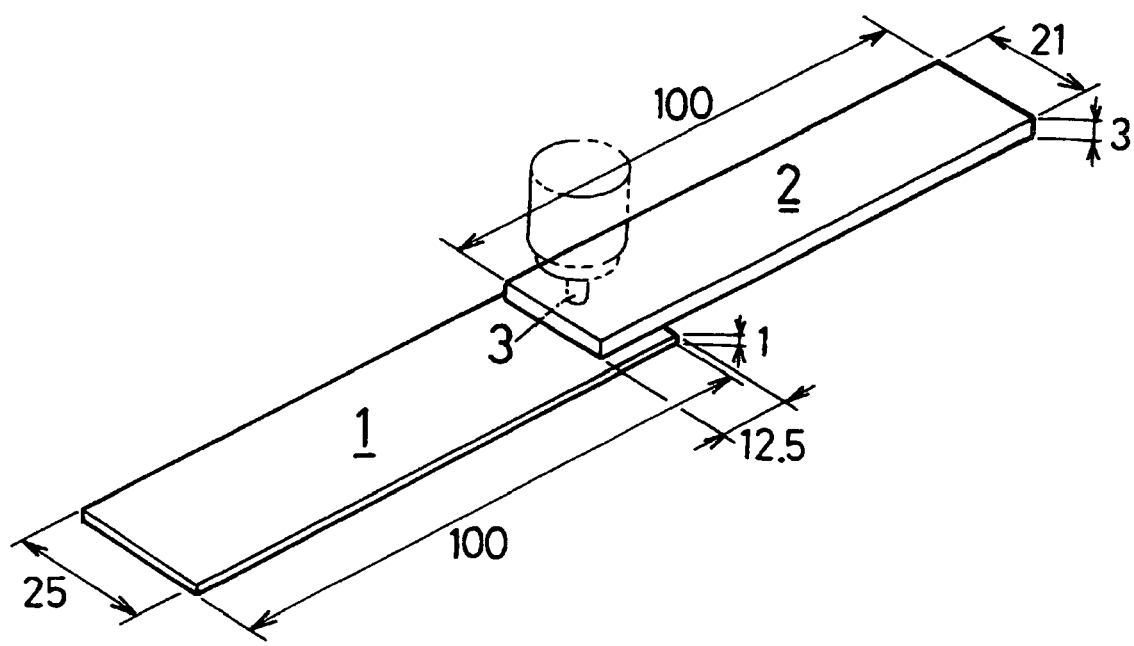

COMPOSITE ARTICLE OF ALUMINUM ALLOY WITH RESIN AND METHOD FOR PRODUCTION THEREOF

This application is a National Stage application of PCT/JP03/14213 filed Nov. 7, 2003 which claims benefit to Japanese application 2002-32544 filed Nov. 8, 2002.

TECHNICAL FIELD

The present invention relates to a composite of an aluminum alloy and a high-strength resin for use in housings of electronic devices, housings of home electrical devices, structural parts, mechanical parts, etc., and also relates to a production method therefor. More particularly, the present invention relates to a structure having a thermoplastic resin integrated with a shaped aluminum alloy material produced by various machining processes. That is, the present invention relates to an aluminum alloy-and-resin composite for use in various electronic devices for mobile applications, home electrical products, medical devices, structural parts for vehicles, vehicle-mounted products, construction material parts, structural parts of various other equipment, parts for exterior applications, and so forth, and also relates to a production method therefor.

BACKGROUND ART

Techniques for integrating a metal and a resin with each other are demanded in a wide variety of fields such as those of manufacturing parts of automobiles, home electrical products, industrial equipment, etc. For this purpose, many adhesives have been developed. Among them are very excellent adhesives. Adhesives that exhibit their function at ordinary temperature or upon heating are used for bonding to integrate a metal and a synthetic resin with each other. The bonding method using such an adhesive is now a common technique.

Meanwhile, researches have heretofore been made to find an even more rational bonding method that does not use an adhesive. However, a method of integrating a high-strength engineering resin with light metals such as magnesium, aluminum and alloys thereof or iron alloys such as stainless steel without using an adhesive has not yet been put to practical use as far as the present inventors know. Examples of such a method include a method wherein a resin component is bonded to a metal by injection or other similar process. This method is named "injection bonding method".

The present inventors conducted exhaustive studies and development and found that bond strength increases uniquely if a shaped metal material is dipped in an aqueous solution of ammonia, hydrazine, or a water-soluble amine compound and thereafter brought into contact with a thermoplastic resin composition containing polybutylene terephthalate (hereinafter referred to as "PBT") as a main component under ordinary injection molding temperature and pressure conditions (see WO 03/064150 A1).

It has also heretofore been known that a metal-and-resin composite product is formed by insert-molding a metal product [for example, see Japanese Patent Application Unexamined Publication (KOKAI) Nos. 2001-225352, Sho 54-13588, Sho 54-13587, Sho 58-217679, Sho 50-158539, and Hei 5-70969]. However, these conventional composite producing methods are for producing electric contacts, aluminum foil, etc., and hence unapplicable to mechanical structures that are required to exhibit strong bond strength (adhesion) and rigidity.

The present inventors further carried out researches to investigate whether or not the above-described increase in bond strength would occur with other kinds of resins. In electron microscope observation of an aluminum alloy dip-treated in an aqueous solution of ammonia, hydrazine or a water-soluble amine compound in the above-described invention proposed by the present inventors, it is revealed that fine recesses having a diameter of 30 to 300 nm are present on the aluminum alloy surface. Observation by X-ray photoelectron spectroscopy reveals that a large amount of nitrogen atoms are present on the aluminum alloy surface.

The above-described facts show that the aluminum alloy surface has been etched extremely finely, and nitrogen compounds attributable to ammonia, hydrazine or a water-soluble amine compound are present on the aluminum alloy surface. The present inventors infer that ammonia, hydrazine or a water-soluble amine compound is chemically adsorbed to the aluminum atoms. If an exothermic reaction takes place when the thermoplastic resin composition contacts the chemisorbed substances, the resin composition may enter the fine recesses on the aluminum alloy surface without rapidly cooling to become solidified.

PBT is an aggregate of carboxylic acid esters, and it is known that carboxylic acid esters exothemically react with an amine compound to form a carboxylic acid amide and an alcohol. This shows that our inference is valid. Then, we examined other polymers that may exothermically react with ammonia, hydrazine or an amine compound as in the case of PBT. One of them is polyphenylene sulfide.

This resin is an engineering plastic material developed by Phillips Petroleum Company, U.S.A., which is produced by desalting polycondensation reaction of p-dichlorobenzene, sodium hydrogensulfide and caustic soda. Because of the production method thereof, the polyphenylene sulfide has a composition containing not only high-molecular weight polyphenylene sulfide but also 3 to 10% low-molecular weight oligomers having several or ten-odd or several tens of phenylene groups.

Moreover, many of these oligomers and polymers have chlorine at the molecule end. The present inventors inferred that the chlorine end reacts with amines, which are basic, under high-temperature conditions while generating heat to form salt. Experimental results revealed that polyphenylene sulfide is also capable of injection-bonding to an aluminum alloy treated in the same way as the above. Although further experiments are needed to evaluate the validity of the above-described inference, it will be a good guideline for understanding the present invention in horizontal development.

With the above-described technical background, the present invention was made to attain the following objects.

An object of the present invention is to obtain an aluminum alloy-and-resin composite wherein a thermoplastic resin composition and a shaped aluminum alloy material are made to adhere so strongly that they will not readily separate from each other by treating the aluminum alloy surface, and also obtain a production method therefor.

Another object of the present invention is to obtain an aluminum alloy-and-resin composite capable of making housings and parts of various devices, structures, etc. free from problems in terms of configuration, structure and mechanical strength, and also obtain a production method therefor.

Still another object of the present invention is to obtain an aluminum alloy-and-resin composite useful for reducing the weight of housings and parts of electronic devices, structures, etc. and for simplifying device manufacturing processes, and also obtain a production method therefor.

DISCLOSURE OF THE INVENTION

Roughly speaking, the present invention adopts the following means to attain the above-described objects.

An aluminum alloy-and-resin composite according to the present invention comprises a shaped aluminum alloy material that has been subjected to a dipping process in which it is dipped in an aqueous solution of at least one selected from the group consisting of ammonia, hydrazine, and a water-soluble amine compound. The aluminum alloy-and-resin composite further comprises a thermoplastic resin composition integrally bonded to the surface of the shaped aluminum alloy material. The thermoplastic resin composition contains polyphenylene sulfide (hereinafter referred to as "PPS") as a component.

Another aluminum alloy-and-resin composite according to the present invention comprises a shaped aluminum alloy material that has been subjected to a dipping process in which after it has been dipped in a basic aqueous solution and/or an acid aqueous solution for pretreatment, the shaped aluminum alloy material is dipped in an aqueous solution of at least one selected from the group consisting of ammonia, hydrazine, and a water-soluble amine compound. The aluminum alloy-and-resin composite further comprises a thermoplastic resin composition integrally bonded to the surface of the shaped aluminum alloy material. The thermoplastic resin composition contains polyphenylene sulfide as a component.

A production method for an aluminum alloy-and-resin composite according to the present invention comprises the step of dipping a shaped aluminum alloy material in an aqueous solution of at least one selected from the group consisting of ammonia, hydrazine, and a water-soluble amine compound. The production method further comprises the step of inserting the shaped aluminum alloy material into a mold and integrating a thermoplastic resin composition containing polyphenylene sulfide to the shaped aluminum alloy material in the mold.

Another production method for an aluminum alloy-and-resin composite according to the present invention comprises the step of dipping a shaped aluminum alloy material in a basic aqueous solution and/or an acid aqueous solution for pretreatment, and the step of dipping the shaped aluminum alloy material after the pretreatment in an aqueous solution of at least one selected from the group consisting of ammonia, hydrazine, and a water-soluble amine compound. The production method further comprises the step of inserting the shaped aluminum alloy material into a mold and integrating a thermoplastic resin composition containing polyphenylene sulfide to the shaped aluminum alloy material in the mold.

The above-described aluminum alloy-and-resin composite production method according to the present invention will be described below in detail.

[Shaped Aluminum Alloy Material]

As a constituent material of the shaped aluminum alloy material, it is possible to use various aluminum alloys such as those standardized as "1000 series" to "7000 series" by JIS (Japanese Industrial Standards) and those for die casting. Among these aluminum alloys, "1000 series" are alloys of high-purity aluminum. The others are alloys containing magnesium, silicon, copper, manganese, etc. in addition to aluminum according to a wide variety of purposes. As a pretreatment process for the surface of the shaped aluminum alloy material, a method that will be described later is preferably used for an alloy containing a relatively large amount of a metal other than aluminum. However, this pretreatment process is not always needed. Anyway, it is possible to use not only high-purity aluminum alloys but also most of aluminum alloys actually used for housings of various devices and so forth at present.

In the case of bonding a resin by injection molding, the shaped aluminum alloy material is formed into a desired configuration from an aluminum alloy ingot, plate, bar or the like by machining, e.g. plastic working, sawing, milling, electrical discharge machining, drilling, press working, grinding, or polishing, which may be used singly or in combination. By this machining process, the aluminum alloy is formed into a shaped aluminum alloy material with a configuration and structure necessary for use as an insert in the injection molding process. The shaped aluminum alloy material processed in this way requires that the surface thereof that is to be bonded should be free from a thick layer of rust formed by oxidation or hydroxidation, for example. When it is clear that rust is present on the surface of the shaped aluminum alloy material as a result of it having been left to stand for a long period of time, the rust needs to be removed by polishing.

[Degreasing Process]

The degreasing process is not always necessary for the present invention. However, fats and oils or fine dust particles may be attached to the surface of the shaped aluminum alloy material. The surface treated by machining process, in particular, may be stained with a lubricant used during the machining process, together with cuttings and so forth. Therefore, it is preferable to wash them off.

It is preferable to remove contamination by washing with a commercially available aluminum degreasing agent or by dipping in a water-soluble organic solvent and to perform rinsing thereafter, although it depends on the kind of contamination. Examples of water-soluble organic solvents include acetone, methanol, and ethanol. If oily matter is firmly attached to the surface, it is also preferable to carry out a process of washing the surface with an organic solvent, e.g. kerosene, benzine, or xylene, before the above-described process.

The storage period of time after the rinsing process should also be shortened as much as possible. It is preferable that the degreasing process and the following process (pretreatment process) should be continuously carried out without interruption, if possible. In a case where these processes are carried out continuously, it is unnecessary to perform drying after the degreasing process.

[Pretreatment Process]

If the following pretreatment process is carried out as a pretreatment for the treatment process (described later), it is possible to provide even more effective bonding between the shaped aluminum alloy material and the thermoplastic resin composition. The pretreatment process is particularly effective for aluminum alloys other than "1000 series" aluminum alloys (pure aluminum alloys). In short, the purpose of this process is to preprocess the aluminum alloy obtained by the previous process so that the aluminum alloy can sufficiently exhibit the desired effects in the following essential process.

That is, this is a treatment for forming the aluminum alloy surface into a finely etched surface. The shaped aluminum alloy material is dipped in a basic aqueous solution (pH>7) first, and then it is rinsed with water. Examples of bases usable in the basic aqueous solution are alkali metal hydroxides, such as sodium hydroxide (NaOH) and potassium hydroxide (KOH), soda ash ($Na_2CO_3$; anhydrous sodium carbonate), which is a low-cost material containing an alkali metal, and ammonia.

Alkali earth metal (Ca, Sr, Ba, Ra) hydroxides are also usable. From the practical point of view, however, a base should be selected from the former group of materials, which are less costly and yet effective. When sodium hydroxide is used, it is preferable to prepare an aqueous solution containing a sodium hydroxide concentration of 0.1% to several percent. In the case of using soda ash, it is also preferable to prepare an aqueous solution containing a soda ash concentration of 0.1% to several percent. The dipping time is from several tens of seconds to several minutes at ordinary temperature or a slightly higher temperature, e.g. from 20 to 50° C. The process serves to dissolve the aluminum alloy surface to renew it. Dipping in the basic aqueous solution allows the aluminum alloy surface to dissolve into aluminate ions while releasing hydrogen. As a result, the aluminum alloy surface is etched to become renewed. After the dipping treatment, rinsing with water is performed.

Acid etching is also usable as pretreatment process other than alkali etching. In the case of acid etching, the aluminum alloy is dipped in an aqueous solution containing an acid of several percent to several tens of percent, e.g. hydrochloric acid, nitric acid, sulfuric acid, or hydrofluoric acid, for from several tens of seconds to several minutes at ordinary temperature or a slightly higher temperature, e.g. from 20 to 50° C. The process serves to dissolve the aluminum alloy surface to renew it in the same way as the above.

In applications, it is possible to adopt a combined method in which the above-described alkali etching is performed, followed by rinsing, and the above-described acid etching is performed, followed by rinsing, or a further combined method in which the acid etching is performed, followed by rinsing, and the alkali etching is performed, followed by rinsing, and further the acid etching is performed, followed by rinsing.

In short, the above-described pretreatment process is a reaction of a non-uniform system involving three phases, i.e. a solid (aluminum alloy), a liquid (aqueous solution), and a gas (hydrogen gas generated). Therefore, it is regarded as a very complicated reaction that is dominated by the composition and structure of the aluminum alloy introduced, particularly the composition and structure of fine portions thereof. Accordingly, it is necessary to search for a method capable of producing as stable results as possible by trial and error.

[Treatment Process]

This treatment process is essential for the present invention. In this process, the aluminum alloy is dipped in an aqueous solution of ammonia, hydrazine or a water-soluble amine compound. The purpose of this process is to finely etch the aluminum alloy surface to thereby form fine recesses and projections thereon and to adsorb such a nitrogen-containing compound on the aluminum alloy surface. Particularly preferable water-soluble amine compounds are methylamine ($CH_3NH_2$), dimethylamine (($CH_3)_2NH$), trimethylamine (($CH_3)_3N$), ethylamine ($C_2H_5NH_2$), diethylamine (($C_2H_5)_2NH$), triethylamine (($C_2H_5)_3N$), ethylene diamine ($H_2NCH_2CH_2NH_2$), ethanol amine (mono-ethanol amine ($HOCH_2CH_2NH_2$), aryl amine ($CH_2CHCH_2NH_2$), diethanol amine (($HOCH_2CH_2)_2NH$), aniline ($C_6H_7N$), triethanol amine (($HOCH_2CH_2)_3N$), etc.

There is an odorless, easily handleable method in which the aluminum alloy is dipped in a 3 to 10% hydrazine monohydrate aqueous solution at 40 to 70° C. for several minutes, followed by rinsing. Similar effects can also be obtained by dipping the aluminum alloy in a 15 to 25% aqueous ammonia solution at 15 to 25° C. for 10 to 30 minutes, followed by rinsing. With this process, however, a strong offensive odor is produced. When other water-soluble amines are used, it is also necessary to search for an optimum temperature, concentration and dipping time by trial and error. In these cases, however, a strong foul odor is emitted. Therefore, an aqueous solution of hydrazine is preferable from the viewpoint of emitting a minimum odor.

[Storage of Shaped Aluminum Alloy Material After Pretreatment]

The shaped aluminum alloy material rinsed in the previous process is preferably subjected to force-drying with air at a relatively low temperature, i.e. from room temperature to about 80° C. Then, the shaped aluminum alloy material is stored under dry air conditions. The storage period of time should preferably be shortened as much as possible. However, there is practically no problem, provided that the storage time is within one week at ordinary temperature.

[Thermoplastic Resin Composition]

The following is a description of the thermoplastic resin composition that is used in the present invention. The thermoplastic resin composition that is integrally bonded to the surface of the shaped aluminum alloy material may be a polymer consisting singly of PPS. Alternatively, it is possible to use a polymer compound of PPS and PBT, a polymer compound of PPS and polycarbonate (hereinafter referred to as "PC"), a polymer compound of PPS and polyethylene terephthalate (hereinafter referred to as "PET"), etc.

It is very important for the thermoplastic resin composition to contain a filler from the viewpoint of obtaining coincidence in the coefficient of linear expansion between the shaped aluminum alloy material and the thermoplastic resin composition. Examples of preferable fillers are glass fiber, carbon fiber, aramid fiber, and other high-strength fibers similar to these. It is also preferable to use at least one selected from publicly known materials such as calcium carbonate, magnesium carbonate, silica, talc, glass, clay, ground carbon fiber, and ground aramid fiber.

[Forming Process/Injection Molding]

The most effective method of integrating a thermoplastic resin composition containing PPS to the surface of a shaped aluminum alloy material is an injection molding method from the viewpoint of productivity, ease of forming, etc. That is, an injection mold is prepared. The mold is opened, and the shaped aluminum alloy material is inserted into one of the mold parts. Then, the mold is closed, and the above-described thermoplastic resin composition is injected. Then, the mold is opened, and the molded product is released. This is the most excellent forming method in terms of the freedom of configuration, productivity, etc. For mass production, a robot should preferably be used for the insert loading operation.

Next, injection molding conditions will be described. Regarding the mold temperature and the injection temperature, a satisfactory bonding effect can be exhibited under injection conditions substantially similar to those for the ordinary injection molding using the above-described thermoplastic resin composition.

[Forming Process/Method Other Than Injection Molding]

An integrated article can be obtained also by a forming method in which both a shaped aluminum alloy material and a thin shaped resin material made of a thermoplastic resin composition are inserted into one mold member and pressed with the other, opposed mold member upon heating, i.e. by a heat pressing process. With this method, the molten resin pressure cannot be made high. Therefore, the force of adhesion between the two materials is weak. However, this method is possible to use, depending on the desired configuration of the integrated article. The principle of bonding (adhesion) is the same as the above-described injection bonding.

As another method, an extrusion process may be used when an integrated article such as a pipe-shaped article or a plate-shaped article is demanded. The extrusion process is also usable for the present invention. It is only important that the above-described thermoplastic resin composition should contact the treated aluminum alloy surface when the resin composition is in a hot melt state. The present invention can use any forming method in theory. With the extrusion process, however, the pressure applied between the molten resin and the metal surface is markedly low in comparison to the injection molding or the like. In this regard, the extrusion process cannot be expected to exhibit the highest bond strength. However, there must be a design sufficiently usable in relation to practicality.

[Operation]

According to the present invention, a shaped aluminum alloy material and a thermoplastic resin composition containing PPS can be firmly bonded to each other by injection molding using an insert or by other technique. It is practically preferable that the thermoplastic resin composition should be PPS containing a high concentration of filler, or a compound containing PPS as a main component.

Such favorable results can be obtained because the aluminum alloy has been treated with an aqueous solution of at least one selected from the group consisting of ammonia, hydrazine, and a water-soluble amine compound. The treatment allows the aluminum alloy surface to change to a PPS-phile surface. Further, the present inventors disclose that it is possible to use a method in which chemical etching by dipping in a basic aqueous solution and/or an acid aqueous solution is additionally carried out before the above-described aqueous solution treatment to allow the thermoplastic resin composition to be firmly bonded to various aluminum alloys.

The present invention is expected to be useful for reducing the weight of electronic devices for mobile applications, home electrical devices, parts of vehicle-mounted devices, and arms and legs of robots, and also useful for supplying parts and housings in many other fields. In particular, PPS is originally fire retardant. Therefore, the present invention is expected to be able to create unique use applications.

BRIEF DESCRIPTION OF THE DRAWING

FIG. 1 is a perspective view showing the configuration of a tensile test piece prepared by injection-bonding together an aluminum alloy piece 1 and a synthetic resin plate 2.

BEST MODE FOR CARRYING OUT THE INVENTION

An embodiment of the present invention will be described below in detail by way of experimental examples.

Experimental Example 1

A commercially available aluminum alloy plate A5052 with a thickness of 1 mm was purchased. The aluminum alloy plate was cut into 10 rectangular pieces of 100 mm by 25 mm. The aluminum alloy pieces were stuck to a rubber sheet with a double-sided adhesive tape, and this was put in a sandblast apparatus (not shown). The aluminum alloy pieces were subjected to an air blast treatment with the air pulse duration set so that the stock removal was at a level of about 5 µm. Then, the aluminum alloy pieces were taken out of the sandblast apparatus and allowed to stand for within 5 hours on the average under ordinary temperature and ordinary pressure conditions. Thereafter, the aluminum alloy pieces were dipped for 10 minutes in 1 liter of acetone while being subjected to ultrasonic waves, followed by washing with tap water.

Next, 2 liters of hydrochloric acid diluted with ion-exchanged water to a concentration of 1% was put into a large-sized beaker kept at 40° C. The above-described aluminum alloy pieces were successively dipped in the diluted hydrochloric acid for 1 minute by being stood against the glass wall of the beaker in such a manner as not to contact each other, followed by washing with running tap water obtained in Nitta-machi, Gunma Prefecture, Japan. Subsequently, the aluminum alloy pieces were similarly dipped for 1 minute in 2 liters of aqueous caustic soda solution diluted with ion-exchange water to a concentration of 1%, followed by washing with tap water. Subsequently, the aluminum alloy pieces were similarly dipped for 1 minute in 2 liters of hydrochloric acid diluted with ion-exchange water to a concentration of 1%. Then, the aluminum alloy pieces were successively dip-washed in three beakers each filled with 2 liters of ion-exchange water.

Next, 2 liters of ion-exchange water solution containing 5% hydrazine monohydrate was prepared, and the above-described aluminum alloy pieces were successively dipped therein for 2 minutes at 50° C. Then, the aluminum alloy pieces were successively dip-washed in three beakers each filled with 2 liters of ion-exchange water, followed by force-drying with warm air at 50° C. for 10 to 20 minutes. The dried aluminum alloy pieces were put in a storage box filled with dry air.

After two days, the aluminum alloy pieces were taken out of the storage box and each inserted into an injection mold at 120° C. by being picked up with a gloved hand so that oil or other contaminant would not be attached thereto. After the injection mold had been closed, a PPS resin 3 containing 30% glass fiber [trade name: Susteel BGX-130 (available from Tosoh Corporation)] was injected at 330° C. to obtain an integrated composite as shown in FIG. 1. After two days, a tensile breaking test was performed with a tensile testing machine. The shear breaking strength was 2452 N (250 kgf) on the average.

Experimental Example 2

A commercially available aluminum alloy plate A110 (Japanese Industrial Standards (JIS)) with a thickness of 1 mm was purchased. The aluminum alloy plate was cut into 10 rectangular pieces of 100 mm by 25 mm. The aluminum alloy pieces were treated by almost the same method as in Experimental Example 1. This Example differs from Experimental Example 1 only in that a 25% ammonia aqueous solution was used in place of the hydrazine aqueous solution, and that the temperature during the treatment was 25° C., and further that the dipping time was 30 minutes. The treated aluminum alloy pieces were put in a storage box filled with dry air.

After three days, the aluminum alloy pieces were taken out of the storage box and each inserted into an injection mold by being picked up with a gloved hand so that oil or other contaminant would not be attached thereto. Thereafter, molding was carried out in the same way as in Experimental Example 1. Then, a tensile breaking test was performed with a tensile testing machine. The shear breaking strength was 1863 N (190 kgf) on the average.

INDUSTRIAL APPLICABILITY

The present invention is industrially applicable in the fields of various electronic devices for mobile applications, home electrical products, medical devices, automotive bodies, vehicle-mounted products, construction material parts, structural parts of various other machines, various parts for interior and exterior applications, and so forth.

What is claimed is:

1. An aluminum alloy-and-resin composite comprising:
a shaped aluminum alloy material that has been subjected to a dipping process in which it is dipped in a 3 to 10% hydrazine monohydrate aqueous solution at 40 to 70° C. forming fine recesses and adsorbing nitrogen-containing compounds attributable to hydrazine on a surface of said shaped aluminum alloy, said fine recesses having a diameter of 30 to 300 nm on the surface of said shaped aluminum alloy material, said fine recesses having been formed by a basic reaction, wherein after the dipping process, the shaped aluminum alloy material is dried with warm air of room temperature to 80° C.; and
a thermoplastic resin composition integrally bonded to the surface of said shaped aluminum alloy material by injection, said thermoplastic resin composition containing polyphenylene sulfide as a component.

2. An aluminum alloy-and-resin composite according to claim 1, wherein said shaped aluminum alloy material is dipped in the hydrazine monohydrate aqueous solution for several minutes.

3. An aluminum alloy-and-resin composite comprising:
a shaped aluminum alloy material that has been subjected to a dipping process in which after it has been dipped in a basic aqueous solution and/or an acid aqueous solution for pretreatment, said shaped aluminum alloy material is dipped in a 3 to 10% hydrazine monohydrate aqueous solution at 40 to 70° C. forming fine recesses and adsorbing nitrogen-containing compounds attributable to hydrazine on a surface of said shaped aluminum alloy, said fine recesses having a diameter of 30 to 300 nm on the surface of said shaped aluminum alloy material, said fine recesses having been formed by a basic reaction, wherein after the dipping process, the shaped aluminum alloy material is dried with warm air of room temperature to 80° C.; and
a thermoplastic resin composition integrally bonded to the surface of said shaped aluminum alloy material by injection, said thermoplastic resin composition containing polyphenylene sulfide as a component.

4. An aluminum alloy-and-resin composite according to claim 3, wherein said shaped aluminum alloy material is dipped in the hydrazine monohydrate aqueous solution for several minutes.

5. An aluminum alloy-and-resin composite according to claim 1 or 3, wherein said shaped aluminum alloy material is dipped in the hydrazine monohydrate aqueous solution at 50° C. for two minutes.

6. A production method for an aluminum alloy-and-resin composite, comprising the steps of:
dipping a shaped aluminum alloy material in a 3 to 10% hydrazine monohydrate aqueous solution at 40 to 70° C. to form fine recesses having a diameter of 30 to 300 nm on the surface of said shaped aluminum alloy material by a basic reaction and to adsorb nitrogen-containing compounds attributable to hydrazine to a surface of said shaped aluminum alloy;
drying the shaped aluminum alloy material with warm air at room temperature to 80° C. after the dipping step;
inserting into a mold after the drying step, said shaped aluminum alloy material having said nitrogen-containing compounds adsorbed to said surface; and
integrating a thermoplastic resin composition containing polyphenylene sulfide to the surface of said shaped aluminum alloy material in said mold.

7. A production method for an aluminum alloy-and-resin composite according to claim 6, wherein said step of dipping said shaped aluminum alloy material further comprises dipping said shaped aluminum alloy material in the hydrazine monohydrate aqueous solution for several minutes.

8. A production method for an aluminum alloy-and-resin composite, comprising the steps of:
dipping a shaped aluminum alloy material in a basic aqueous solution and/or an acid aqueous solution for pretreatment;
dipping said shaped aluminum alloy material after said pretreatment in a 3 to 10% hydrazine monohydrate aqueous solution at 40 to 70° C. to form fine recesses having a diameter of 30 to 300 nm on the surface of said shaped aluminum alloy material by a basic reaction and to adsorb nitrogen-containing compounds attributable to hydrazine to a surface of said shaped aluminum alloy;
drying the shaped aluminum alloy material with warm air at room temperature to 80° C. after the dipping step;
inserting into a mold after the drying step, said shaped aluminum alloy material having said nitrogen-containing compounds adsorbed to said surface; and
integrating a thermoplastic resin composition containing polyphenylene sulfide to the surface of said shaped aluminum alloy material in said mold.

9. A production method for an aluminum alloy-and-resin composite according to claim 8, wherein said step of dipping said shaped aluminum alloy material after said pretreatment further comprises dipping said shaped aluminum alloy material in the hydrazine monohydrate aqueous solution for several minutes.

10. A production method for an aluminum alloy-and-resin composite according to claim 8, wherein said step of dipping said shaped aluminum alloy material after said pretreatment further comprises dipping shaped aluminum alloy material in the hydrazine monohydrate aqueous solution at 50° C. for two minutes.

* * * * *

UNITED STATES PATENT AND TRADEMARK OFFICE
CERTIFICATE OF CORRECTION

PATENT NO. : 8,367,210 B2
APPLICATION NO. : 10/533655
DATED : February 5, 2013
INVENTOR(S) : Naritomi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1164 days.

Signed and Sealed this
First Day of September, 2015

Michelle K. Lee
*Director of the United States Patent and Trademark Office*